United States Patent
Marini et al.

(10) Patent No.: US 10,224,845 B2
(45) Date of Patent: Mar. 5, 2019

(54) METHOD FOR DETERMINING AN OPERATIONAL READINESS STATE OF AN ELECTRIC MOTOR

(71) Applicant: Röchling Automotive SE & Co. KG, Mannheim (DE)

(72) Inventors: Luca Marini, Besenello (IT); Stefano Dalpez, Malè (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 0 days.

(21) Appl. No.: 15/366,588

(22) Filed: Dec. 1, 2016

(65) Prior Publication Data
US 2017/0163186 A1 Jun. 8, 2017

(30) Foreign Application Priority Data
Dec. 3, 2015 (DE) .................. 10 2015 224 254

(51) Int. Cl.
*H02P 6/20* (2016.01)
*H02P 6/12* (2006.01)
*H02P 29/024* (2016.01)
*H02P 1/02* (2006.01)

(52) U.S. Cl.
CPC ............... *H02P 6/20* (2013.01); *H02P 1/022* (2013.01); *H02P 6/12* (2013.01); *H02P 29/024* (2013.01)

(58) Field of Classification Search
CPC ........ H02P 27/06; H02P 29/02; H02P 29/032; H02P 6/12; H02P 6/20; H02P 29/027; H02P 6/28
See application file for complete search history.

(56) References Cited

U.S. PATENT DOCUMENTS

| | | | | |
|---|---|---|---|---|
| 4,291,265 A | * | 9/1981 | Kawada | ............... H02H 7/0833 318/782 |
| 5,019,756 A | | 5/1991 | Schwarz | |
| 6,525,506 B2 | * | 2/2003 | Jin | ............... H02P 29/02 318/599 |
| 7,271,562 B2 | * | 9/2007 | Lee | ............... H02P 1/163 318/432 |
| 8,966,883 B2 | | 3/2015 | Gouriet | |

(Continued)

FOREIGN PATENT DOCUMENTS

| | | |
|---|---|---|
| DE | 40 09 258 A1 | 10/1990 |
| DE | 10 2007 039 212 A1 | 2/2009 |
| DE | 11 2009 001 331 T5 | 4/2011 |

OTHER PUBLICATIONS

Search Report issued for German Patent Application No. 10 2015 224 254.4 dated Mar. 30, 2017, with English machine translation (16 pages).

*Primary Examiner* — Thai Dinh
(74) *Attorney, Agent, or Firm* — Prince Lobel Tye LLP (57) ABSTRACT

A method is provided for determining an operational readiness state of an electric motor, a pump motor for pumping an operating fluid, for example, an aqueous urea solution, in a vehicle. The method includes applying an electric drive voltage to the electric motor according to a prescribed drive voltage curve in order to drive a rotor of the electric motor to rotate through a prescribed angle of rotation, detecting a response behavior of the electric motor, and determining the state of the electric motor based on the results determined in step b).

23 Claims, 6 Drawing Sheets

(56) References Cited

U.S. PATENT DOCUMENTS

| | | | |
|---|---|---|---|
| 8,981,694 B2* | 3/2015 | Yoon | H02P 6/165 |
| | | | 318/400.32 |
| 9,294,029 B2* | 3/2016 | Veijanen | H02P 21/13 |
| 2005/0029976 A1* | 2/2005 | Terry | F04B 35/04 |
| | | | 318/400.21 |
| 2011/0062903 A1* | 3/2011 | Li | H02P 5/46 |
| | | | 318/400.02 |
| 2013/0063060 A1* | 3/2013 | Dorner | H02P 6/085 |
| | | | 318/400.14 |
| 2014/0049201 A1* | 2/2014 | Hirono | H02P 1/166 |
| | | | 318/400.23 |
| 2016/0190964 A1* | 6/2016 | Shin | H02P 21/145 |
| | | | 318/490 |

\* cited by examiner

METHOD FOR DETERMINING AN OPERATIONAL READINESS STATE OF AN ELECTRIC MOTOR

CROSS REFERENCE TO RELATED APPLICATION(S)

This application claims priority to German Application No. 10 2015 224 254.4, filed Dec. 3, 2015. The entirety of the disclosure of the above-referenced application is incorporated herein by reference.

BACKGROUND OF THE INVENTION

Field of the Invention

The present invention relates to a method for determining an operational readiness state of an electric motor, preferably a pump motor for pumping an operating fluid, for example, an aqueous urea solution, in a vehicle.

Description of the Related Art

Such a method is known from document WO 2009/147146 A1. In this known method the operational readiness state of an electric motor configured as a pump motor for pumping aqueous urea solution is determined based on the temperature of the aqueous urea solution to be pumped. If this temperature lies above a prescribed temperature threshold value, it is determined that the electric motor is ready for operation and that a pumping operation can be started. On the other hand, if this temperature lies below the temperature threshold value, it is determined that the electric motor must be heated in order to transfer it into an operational readiness state.

In the method known from this document, indirect determination of the operational readiness state of the electric motor based on the temperature of the aqueous urea solution to be pumped is disadvantageous, since the temperature of the aqueous urea solution need not necessarily be identical to the temperature of the electric motor. The temperature of the electric motor can be lower than the temperature of the aqueous urea solution so that in the extreme case frozen aqueous urea solution can be on the electric motor, while the temperature at the location of the temperature sensor lies above the temperature threshold value. In such a case the state of the electric motor would be determined as ready for operation, so that under certain circumstances with actual starting of a pumping operation the electric motor could be damaged.

SUMMARY OF THE INVENTION

In light of these disadvantages known from the prior art, it is an object of the present invention to specify a method with which an operational readiness state of an electric motor is more precisely determinable in comparison with the prior art.

According to the invention this object is achieved by an initially defined method that comprises the following steps, preferably carried out in the following order:

a) applying of an electric drive voltage to the electric motor according to a prescribed drive voltage curve in order to drive a rotor of the electric motor to rotate through a prescribed angle of rotation, wherein the prescribed angle of rotation is smaller than 360°, preferably smaller than 90°, particularly preferably smaller than 45°, b) detecting a response behavior of the electric motor, comprising the partial steps:

b1) determining whether the rotor rotates through the prescribed angle of rotation due to the application of the electrical drive voltage in step a), and b2) detecting an electric current flowing through the electric motor during the application of the electrical drive voltage in step a), c) determining the state of the electric motor based on the results determined in step b).

In contrast to the method known from the prior art, according to the invention the operational readiness state is not indirectly determined, for example, by detecting a temperature of a medium to be pumped, but directly based on the detected response behavior of the electric motor to the drive voltage applied in step a). The detected response behavior can subsequently be used as the basis for determining of operational readiness of the electric motor. This approach thus permits a more precise determination of an operational readiness state of the electric motor in comparison with the prior art and also permits a more comprehensive diagnosis of the electric motor in comparison with the prior art, which also makes it possible to find faults of the electric motor that are not caused by low temperatures.

In the inventive method the drive voltage has a drive voltage curve such that the rotor is driven to rotate through an angle smaller than 360°. The period of time during which electric current flows through the electric motor can thereby be reduced in comparison with a drive voltage curve with which the rotor is driven to rotate through 360°, so that in case of an operating fault of the electric motor, due to which the rotor is not rotatable, the electric power dissipated in the electric motor is limited in order not to damage the electric motor.

Rotation of the rotor in partial step b1) can be determined, for example, using a sensor positioned on the rotor, for example, an optical sensor or a Hall sensor.

When it is stated in this application that an electric voltage is applied to the electric motor or that an electric current flows through the electric motor, this can mean in particular that an electric voltage is applied to windings of the electric motor or that an electric current flows through windings of the electric motor.

In partial step b2) the total electric current flowing through the electric motor can be detected. This need not necessarily be due to the drive voltage applied to the electric motor, but can also be caused by induction due to the rotation of the rotor. Here the effective value and/or the maximum value of the electric current can be detected. It is to be noted that instead of the electric current flowing through the electric motor or in addition to this the voltage decrease at the electric motor can also be detected in partial step b2). However, detecting the voltage drop is essentially equivalent to detecting the electric current, since the current is proportional to the voltage drop. Below only detection of the electric current flowing through the electric motor is discussed. However, in this respect the embodiments below apply analogously for a voltage decrease detected at the electric motor.

If the drive voltage has a drive voltage curve such that the rotor is driven to rotate through an angle smaller than 360°, it is advantageous if a plurality of steps are carried out one after another, wherein for each step a) and step b) is carried out. It can thereby be determined by repeated implementation of step a) whether the rotor can perform a full rotation or whether a certain rotational angle range is blocked.

Depending on the actual field of application of the electric motor it can be necessary to have to rotate it in opposite rotational directions, for example in order pump the medium in opposite directions. Against this background it is preferred if the plurality of steps a) comprises:

- at least one substep a1), wherein a first drive voltage is applied to the electric motor in order to drive the rotor to rotate in a first rotational direction, and
- at least one substep a2), wherein a second drive voltage is applied to the electric motor in order to drive the rotor to rotate in a second rotational direction opposite to the first rotational direction.

In this further development it can thus be checked stepwise whether the rotor shows an expected response behavior in the opposite rotational directions. By repeated implementation of the substeps a1) and a2), the full rotational angle of 360° can thereby also be sampled, and it can be checked whether the electric motor shows an expected response behavior in all angular ranges.

A systematic and thus effective approach with senses the full rotational angle range of the rotor can be obtained by the step a) comprising at least N substeps a1), which are performed consecutively. N can be chosen here such that in the N-fold embodiment of the substeps a1) the rotor performs at least one full rotation, i.e., a rotation through 360°, in the first rotational direction.

In a further development of the method it can further be provided that the step a) comprises at least M substeps a2), which are performed consecutively after the N-fold performance of the substeps a1). Here M can be chosen such that in the M-fold performance of the substeps a2) the rotor performs at least one full rotation, i.e., a rotation through 360°, in the second rotational direction. N and M usually have values of less than 100.

A high reliability in determining the response behavior of the electric motor can be ensured if a set of N performances of the substeps a1) and M performances of the substeps a2) are performed U times. In practice a value for U of under 20 has proven sufficient to reliably determine the response behavior and to precisely determine therefrom the state of the electric motor.

In order to be able to prevent damage to the electric motor due to excessively high electric power dissipated inside the electric motor, for example, if the rotor is blocked, it can be provided in a further development of the invention that the drive voltage applied to the electric motor during step a) is switched off if the electric current detected in the associated step b) is greater than a prescribed threshold value. The inventive method is preferably provided for electric motors used as pump motors in vehicles. For such electric motors the threshold values at which the current is switched off are approximately 3 A for the effective value and approximately 10 A for the maximum value of the electric current. Switch-off can occur immediately or with a certain time delay, for example, after checking the detected current value.

In a further development of the invention it can be provided that the electric motor is a three-phase brushless motor, wherein each phase is associated with its own magnetic-field-generating means, wherein preferably during performance of step a) a drive voltage is applied simultaneously only to the magnetic-field-generating means of two phases, while no electric drive voltage is applied to the magnetic-field-generating means of a third phase.

The drive voltage applied in step a) to the magnetic-field-generating means of the respective phases can be the operating voltage for an intended operation of the electric motor, with the difference that in step a) an electric voltage is not applied simultaneously to all magnetic-field-generating means of all phases. Alternatively or additionally the difference between the drive voltage applied in step a) to the electric motor and the operating voltage can in the course of time consist of the minimum value and/or the maximum value of the electric voltage applied to the magnetic-field-generating means of the respective phases.

Here "magnetic-field-generating means" is understood to mean any arrangement of electrical conductors that when an electric current is conducted can generate a magnetic field that is suited for rotating the rotor. Magnetic-field-generating means are particularly understood to be coils wherein a phase can also be associated with a plurality of coils. The magnetic-field-generating means can be disposed in the circumferential direction about an axis of rotation of the rotor on a stator, preferably equidistantly. If the magnetic-field-generating means of each of the three phases have a plurality of coils, then it is preferred if the coils of the respective phases are disposed one after the other in the circumferential direction such that three coils of different phases directly follow one another in a prescribed sequence and that this sequence repeats cyclically in the circumferential direction. In a preferred embodiment each phase includes two coils which are disposed about the rotor in the above manner.

Although it should not be ruled out that the rotor itself can also comprise an electromagnet, with a view to a simple construction of the electric motor it is preferred if the rotor is permanently magnetized. The design can be such that the rotor comprises a plurality of permanent magnets extending essentially along an axis of rotation of the rotor, which permanent magnets are disposed on the outer circumference of the rotor such that an alternating sequence of opposing magnetic poles can be provided on the outer circumference. In a preferred embodiment the rotor includes ten poles on its outer circumference which have the same extension in the circumferential direction.

In order to be able to drive the rotor with multiple performance of step a) to rotation through the prescribed angle of rotation, in each of a plurality of consecutive steps, the drive voltages to be applied to the magnetic-field-generating means of the respective phases can be chosen such that with each two immediately consecutive performances of step a) no drive voltage is applied to the magnetic-field-generating means of different phases.

The drive voltage curve of the drive voltage to be applied to the magnetic-field-generating means of one phase for driving the rotor through the prescribed angle of rotation can essentially be comprised of a DC voltage V, which is applied to the magnetic-field-generating means during a prescribed time span. The respective drive voltages can each comprise a base sequence of drive voltage values, which are cyclically repeated for the respective phases.

For the preceding preferred embodiment of the of the three-phase brushless motor, comprising a stator with six coils and a rotor with ten poles, a base sequence for the first phase can comprise the following drive voltage values to be applied to the magnetic-field-generating means of the first phase in the following sequence:

0. −V
1. 0
2. +V
3. +V
4. 0
5. −V.

For the second phase the base sequence can comprise the following drive voltage values to be applied to the magnetic-field-generating means of the second phase in the following sequence:
0. +V
1. +V
2. 0
3. −V
4. −V
5. 0.

For the third phase the base sequence can comprise the following drive voltage values to be applied to the magnetic-field-generating means of the third phase in the following sequence:
0. 0
1. −V
2. −V
3. 0
4. +V
5. +V.

Using these drive voltage values the rotor can be driven to continuous rotation in one direction of rotation with cyclical repetition of the above base sequences for each phase.

If during the performance of step a) a drive voltage is applied only to the magnetic-field-generating means of two phases, while at the magnetic-field-generating means of the third phase no drive voltage is applied, then in step b) an electromotive force can be detected, which is generated in the magnetic-field-generating means of that phase at which no drive voltage is applied during the performance of step a). The electromotive force generated in the magnetic-field-generating means of this phase depends on the specific rotation of the rotor due to the application of a drive voltage. The detection of the electromotive force in the magnetic-field-generating means of this phase thus offers in particular the possibility that in step b) the rotational angle covered by the rotor due to the applied drive voltage in step a) can be concluded from the detected electromotive force. Separate sensors for detecting rotation of the rotor can thereby be omitted, which contributes to a compact overall design.

Depending on the results determined in step b), step c) can comprise the following states:
"normal," if it is detected in step b) that the rotor rotates through the prescribed angle of rotation in opposing rotational directions, and the electric current detected in step b) lies within a prescribed range,
"faulty," if it is detected in step b) that the rotor does not rotate through the prescribed angle of rotation in opposing rotational directions, and/or the electric current detected in step b) does not lie within the prescribed range.

If the state of the electric motor is determined to be "normal" then the electric motor is ready for operation. If the state of the electric motor is determined to be "faulty" then the electric motor may not necessarily be unready for operation; under certain circumstances actions can be taken for producing an operational readiness state of the electric motor. However, these actions depend on the specific fault of the electric motor, which can optionally be characterized in more detail for taking the appropriate action.

The "faulty" state can include a "critical" state if it is detected in step b) that the rotor rotates through the prescribed angle in opposite directions and the electric current detected in step b) lies outside the prescribed range. The "critical" state can be present, for example, if the electric motor is in a cold environment, and due to thermally caused mechanical stresses more power is required than with higher temperatures to rotate the rotor through the prescribed angle of rotation.

Furthermore the "faulty" state can comprise the following states:
"blocked in one direction," if it is detected in step b) that the rotor rotates through the prescribed angle of rotation only in one rotational direction,
"blocked," if it is detected in step b) that the rotor does not rotate through the prescribed angle of rotation in any rotational direction and the electric current detected in step b) lies above the prescribed range,
"inoperative," if in step b) it is detected that the rotor does not rotate through the prescribed angle of rotation in any direction of rotation and the electric current detected in step b) lies outside the prescribed range.

If the state of the electric motor has been determined to be "critical," then after step c) the method can comprise a step d) wherein in step d) an electric operating voltage for an intended operation is applied to the electric motor during a prescribed period of time for continuous rotation of the rotor in a direction of rotation, and the electric current flowing through the electric motor is detected, wherein the state of the electric motor
is determined as "normal" if the electric current detected in step d) assumes values during the prescribed time period that lie in the prescribed range, or
is determined as "inoperative" if the electric current detected in step d) assumes no values during the prescribed time period that lie within the prescribed range.

With this approach an attempt is made using heat generated during operation of the electric motor to eliminate possible thermally caused mechanical stresses inside the electric motor. If this succeeds, then after or even during the prescribed time period the detected electric current assumes values that lie within the prescribed range. The state of the electric motor can thus be determined as "normal" so that the electric motor is thus ready for operation. If no current values that lie in the prescribed range are detected during the prescribed time period, then a different problem may be present, for example thermally induced mechanical stresses, whose elimination would require thorough examination of the electric motor. The state of the electric motor is thus "inoperative" and the electric motor is thus not ready for operation. A prescribed time period of more than 60 s has proven advantageous for this purpose. If the electric motor is set up as a pump motor, then during the prescribed time period a normal pumping operation for pumping a fluid, for example, can be started. In this context an "operating voltage" is thus understood to be a voltage to be applied to the electric motor in regular operation if the electric motor is ready for operation.

In a further development of the invention it can be provided that the method comprises a step d') after the step c), if in step c) the state has been determined as "blocked" or "blocked in one direction," wherein in step d') an electric heating drive voltage is applied to the electric motor for a prescribed maximum time period in order to drive the rotor to rotate, preferably in different rotational directions, wherein simultaneously the electric current flowing through the electric motor due to the heating drive voltage is detected, and it is determined whether the rotor rotates due to the heating drive voltage until one of the following conditions occurs:

i) the prescribed maximum duration is elapsed without the rotor having rotated or without the rotor having rotated in the previously blocked direction of rotation, ii) the rotor rotates or rotates in the previously blocked direction of rotation, iii) the electric current flowing through the electric motor has fallen below a prescribed threshold value.

In principle, as in step a), an essentially constant DC voltage VH can be applied in step d') for a prescribed time period only to the magnetic-field-generating means of two phases, while no voltage is applied to the magnetic-field-generating means of the third phase. Similarly to the multiple performance of step a), in step d') this DC voltage can also be changed at the end of the prescribed time span in order to drive the rotor to rotate through a multiple of the prescribed angle of rotation. However, in contrast to the drive voltage, it is preferred that the rotor be subjected to a change in rotational direction more often by the heating drive voltage in order to effectively release a blockage, for example, by a frozen medium in the region of the electric motor. Here the heating drive voltages to be applied to the magnetic-field-generating means of the respective phases can also comprise a base sequence of heating drive voltage values, which can be repeated cyclically.

For the previously described electric motor comprising a stator with six coils and a rotor with ten poles, the base sequence for the first phase can comprise the following heating drive voltage values to be applied to the magnetic-field-generating means of the first phase in the following sequence:

0. −VH
1. 0
2. +VH
3. 0.

For the second phase the base sequence can comprise the following heating drive voltage values to be applied to the magnetic-field-generating means of the second phase in the following sequence:

0. +VH
1. +VH
2. 0
3. +VH.

For the third phase the base sequence can comprise the following heating drive voltage values to be applied to the magnetic-field-generating means of the third phase in the following sequence:

0. 0
1. −VH
2. −VH
3. −VH.

If these heating drive voltage values repeat cyclically for each phase, in contrast to the previously discussed drive voltages the rotor of the electric motor is subjected more often to a change in direction of rotation, namely between each step 0 and 1 and each step 2 and 3.

However, this sequence of heating drive voltage values is only exemplary and can be changed in diverse ways depending on the specific design of the electric motor.

If the electric motor is configured as a pump motor for pumping a fluid, preferably of aqueous urea solution, from a tank, it can be provided that the step d') is only performed if at least one further condition is fulfilled, which is indicative of low temperatures in the region of the electric motor, for example, if the temperature at the tank lies below a temperature threshold value and/or if a tank heater is operated.

If the electric motor does not rotate at the end of the prescribed maximum time period after application of the heating drive voltage, then the method can be ended and the state of the electric motor can be determined as "inoperative." Therefore it is not ready for operation. If the rotor of the electric motor is rotated by the heating drive voltage or if the current lies below a prescribed threshold value of typically less than 0.5 A during or at the end of the prescribed maximum time period, then the steps a) to c) can be performed again in order to characterize the response behavior of the electric motor again and to determine again the state of the electric motor based on the response behavior. The prescribed maximum time period is preferably between 120 and 4000 s.

BRIEF DESCRIPTION OF THE DRAWING FIGURES

The present invention is explained in more detail below with reference to the accompanying figures.

DETAILED DESCRIPTION OF THE PREFERRED EMBODIMENTS

Figure 1:
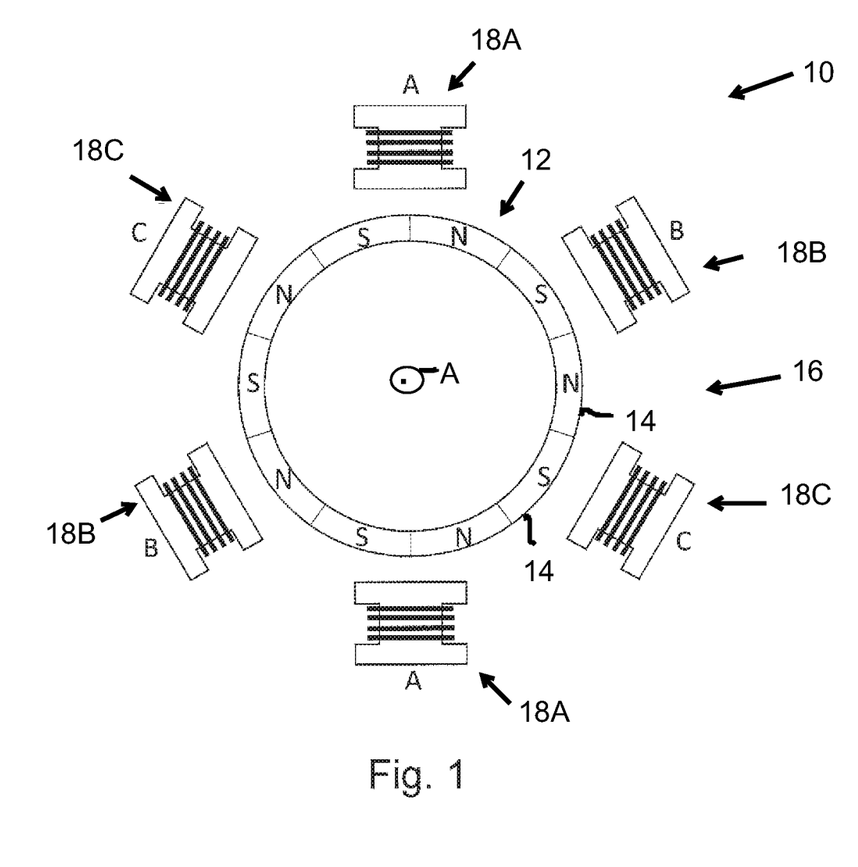
FIG. 1 shows a schematic view of a brushless motor having three phases with a rotor and a stator, which comprises a plurality of magnetic-field-generating means disposed about the rotor to which no voltage is applied.

In FIG. 1 a quiet general electric motor depicted provided with the reference number 10 is shown. The electric motor 10 comprises a rotor 12, rotatable about an axis of rotation A in an operational readiness state, with a plurality of permanent magnets 14 extending along the axis of rotation A, which are disposed on the outer circumference of the rotor 12 such that a sequence of opposing magnetic poles S, N is provided. In the present exemplary embodiment the rotor 12 includes 10 poles, which have the same extension in the circumferential direction.

The electric motor 10 moreover comprises a stator 16 at which magnetic-field-generating means 18A, 18B, 18C, each different from the other, are respectively provided for phases A, B, C. "Magnetic-field-generating means" are understood to mean any arrangement of electric conductors that when an electric current is conducted can generate a magnetic field that is suited for rotating the rotor 12. In the present exemplary embodiment coils can be used in particular as magnetic-field-generating means, wherein here each phase A, B, C is associated with two of the three coils 18A, 18B, 18C. However, this number is only exemplary and can naturally be changed. The coils 18A, 18B, 18C are disposed consecutively on the stator 16 in the circumferential direction about the axis of rotation A of the rotor 12.

An electric motor 10 shown in FIG. 1 can be used, for example, as a pump motor in order to pump an operating fluid of a vehicle, for example. The operating fluid can be aqueous urea solution, for example. In particular if the electric motor 10 is configured as a pump motor for pumping a fluid medium, the risk of damage to the electric motor 10 can arise due to frozen medium. In order to recognize such a state, before a drive voltage is applied to the magnetic-field-generating means 18A, 18B, 18C, a method is carried out for determining an operational readiness state of the electric motor 10.

The method comprises the following steps, preferably to be carried out in the following order:

a) applying an electric drive voltage to the electric motor 10 according to a prescribed drive voltage curve in order to drive the rotor 12 of the electric motor 10 to rotate through a prescribed angle of rotation α, which is smaller than 360°, preferably smaller than 90°, particularly preferably smaller than 45°, b) detecting a response behavior of the electric motor 10, comprising the partial steps:

b1) determining whether the rotor 12 rotates through the prescribed angle of rotation α due to the application of the electrical drive voltage in step a), and b2) detecting an electric current I flowing through the electric motor 10 during the application of the electrical drive voltage in step a), c) determining the state of the electric motor 10 based on the results determined in step b).

In this method the drive voltage has a drive voltage curve such that the rotor is driven to rotate through an angle of rotation α less than 360°. The time period during which electric current I flows through the electric motor 10 can thereby be reduced in comparison with a drive voltage curve where the rotor is driven to rotate through 360°, so that in the case of an operating fault of the electric motor 10 due to which the rotor 12 is not rotatable, the electric power dissipated in the electric motor 10 is limited in order not to damage the electric motor 10.

A rotation of the rotor 12 in partial step b1 can be determined, for example, using a sensor, not depicted here, positioned in the region of the rotor 12, for example, an optical sensor or a Hall sensor. In step a) a drive voltage VA, VB, VC can be applied only to the magnetic-field-generating means 18A 18B, 18C of two of three phases A, B, C, while no drive voltage VA, VB, VC is applied to the magnetic-field-generating means 18A, 18B, 18C of a third phase A, B, C. This approach offers the possibility of detecting the electromotive force EMF generated in the magnetic-field-generating means 18A, 18B, 18C of the third phase A, B, C. This depends in particular on the specific rotation of the rotor 12 and can therefore be used for determining the angle of rotation covered by the rotor 12, so that no additional 20s are required here for detecting rotation of the rotor 12.

In the partial step b2) the total electric current I flowing through the electric motor 10 is measured. This need not necessarily be due to the drive voltage VA, VB, VC applied to the electric motor 10, but can also be caused by induction due to rotation of the rotor 12. Here the effective value and/or the maximum value of the electric current I can be detected.

In order to be able to prevent damage to the electric motor 12 due to a too-high electric power dissipated inside the electric motor, for example, if the rotor 12 is blocked, it can be provided that the drive voltage VA, VB, VC applied to the electric motor 10 during step a) is switched off if the electric current I detected in the associated step b) is greater than a prescribed threshold value I_MAX_TH. The inventive method is preferably provided for electric motors used as pump motors in vehicles. Typical threshold values I_MAX_TH, at which the current is switched off, lie at approximately 3 A for the effective value and at approximately 10 A for the maximum value of the electric current I. Switch-off can occur immediately or only after the performance of a confirmation action.

Figure 2:
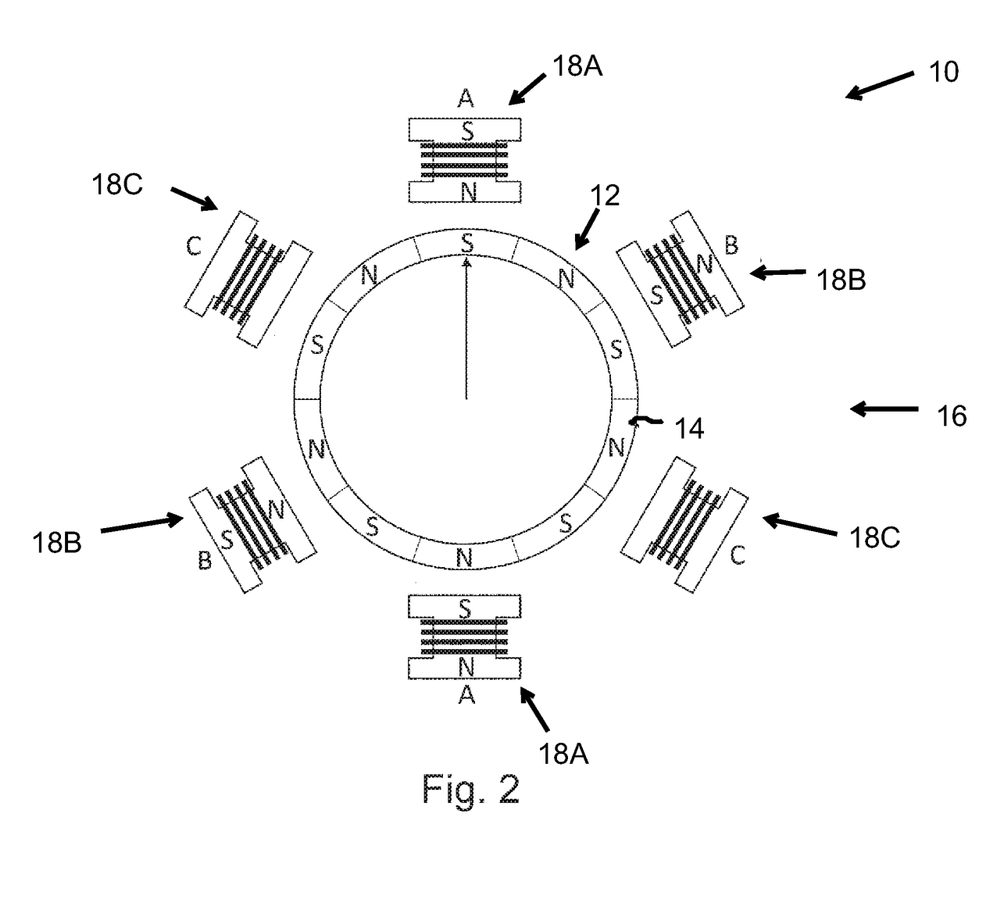
FIG. 2 shows the electric motor shown in FIG. 1 with voltages applied to the magnetic-field-generating means of a first and second phase, while no voltage is applied to the magnetic-field-generating means of a third phase.

While in FIG. 1 no drive voltage is applied to the magnetic-field-generating means 18A, 18B, 18C of the three phases A, B, and C, FIG. 2 shows the electric motor 10 in a state wherein a drive voltage VA, VB is applied to the magnetic-field-generating means 18A and 18B respectively of the first and of the second phase A, B. The magnetic field generated as a result of these drive voltages VA, VB due to the respective magnetic-field-generating means 18A, 18B is indicated by the initials "S" and "N," which are to indicate a south or a north pole. Due to this magnetic field the rotor 12 assumes a defined position relative to the stator 16. This one-time application of the drive voltages VA, VB can already be sufficient for performing further method steps b) and c), in particular if the rotor 12 in the state shown in FIG. 1 has a defined position relative to the stator 16, so that it is drivable by the one-time application of the drive voltages VA, VB to rotation through the prescribed angle of rotation α.

Figure 3:
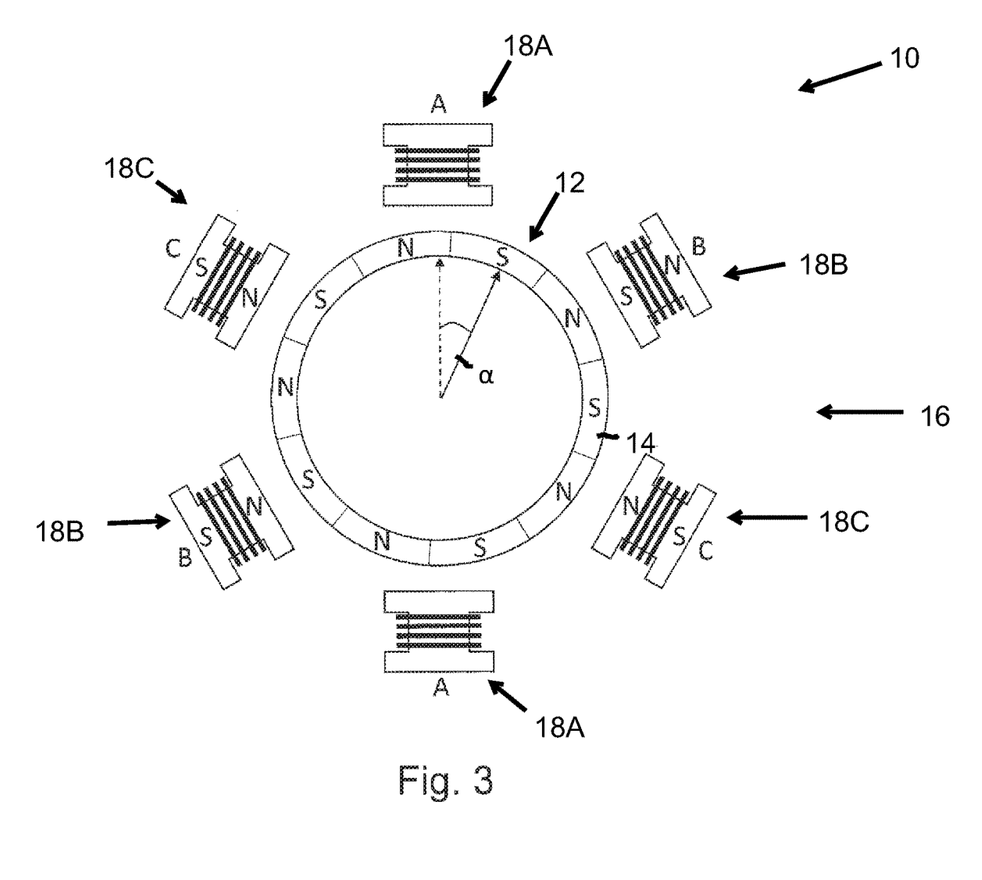
FIG. 3 shows the electric motor shown in FIG. 1 with voltages applied to the magnetic-field-generating means of the second and third phase, while no voltage is applied to the magnetic-field-generating means of the first phase.

Alternatively by applying the drive voltages VA, VB to the magnetic-field-generating means 18A, 18B, the rotor 12 can initially be displaced to a defined position relative to the stator 16 before it is driven to rotation through the prescribed angle of rotation α due to changing of the drive voltages VA, VB, VC. This is depicted in FIG. 3. Compared to the configuration shown in FIG. 2, in FIG. 3 no drive voltage VA is applied to the magnetic-field-generating means 18A of the first phase A, rather only to the magnetic-field-generating means 18B, 18C of the second and third phases B, C. The drive voltage VB applied to the magnetic-field-generating means 18B of the second phase B remains unchanged in comparison with FIG. 2. The rotor 12 is driven to rotation through the prescribed angle of rotation α by these drive voltages VA, VB, VC. This angle of rotation α depends on the number of magnetic-field-generating means per phase and the number of poles on the outer circumference of the rotor 12. In the present exemplary embodiment the prescribed angle of rotation α is approximately 30°.

In order to be able to make reliable statements regarding whether the rotor 12 can perform a full rotation, i.e., a rotation through 360°, it is preferred if the step a) is performed multiple times consecutively, wherein for each step a) a step b) is performed. In order to be able to rotate the rotor 12 once by a full 360° in this embodiment, the step a) must be performed consecutively approximately 12 times. Of course the rotor 12 can also be rotated a plurality of times by a full 360°, in order to particularly reliably be able to make statements as to whether the electric motor 10 is ready for operation.

Figure 4:
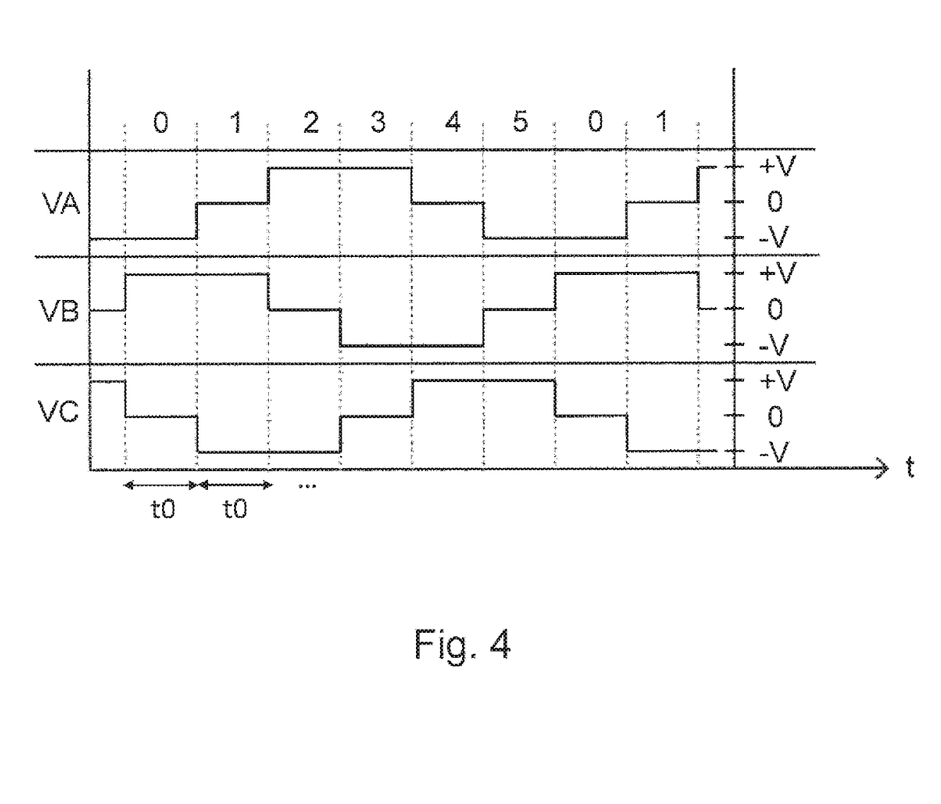
FIG. 4 shows a sequence of drive voltage values for the three phases of the electric motor.

For the electric motor 10 shown in FIGS. 1 to 3 the drive voltages VA, VB, VC can be changed according to FIG. 4 in order to be able to drive the rotor 12 to a repeated rotation in one direction of rotation through the prescribed angle α. The respective drive voltages VA, VB, VC each comprise a base sequence of drive voltage values which can be cyclically repeated for the respective phases A, B, C.

According to FIG. 4 the base sequence comprises for the first phase A the following drive voltage values to be applied in the following sequence to the magnetic-field-generating means 18A of the first phase A:
- 0. −V
- 1. 0
- 2. +V
- 3. +V
- 4. 0
- 5. −V.

According to FIG. 4 the base sequence comprises for the second phase B the following drive voltage values to be applied in the following sequence to the magnetic-field-generating means 18B of the second phase B:
- 0. +V
- 1. +V
- 2. 0
- 3. −V
- 4. −V
- 5. 0.

According to FIG. 4 the base sequence comprises for the third phase C the following drive voltage values to be applied in the following sequence to the magnetic-field-generating means 18C of the third phase C:
- 0. 0
- 1. −V
- 2. −V
- 3. 0
- 4. +V
- 5. +V Here V is a DC voltage, which is applied during a prescribed time period t0 to the magnetic-field-generating means 18A, 18B, 18C of a specific phase A, B, C.

Depending on the actual field of application of the electric motor 10, it can be necessary to have to rotate it in opposite rotational directions, for example in order to pump a medium in opposite directions. Against this background it is preferred if the plurality of steps a) comprises:
- at least one substep a1), wherein a first drive voltage VA, VB, VC is applied to the electric motor 10 in order to drive the rotor 12 to rotate in a first rotational direction, and
- at least one substep a2), wherein a second drive voltage is applied to the electric motor 10 in order to drive the rotor 12 to rotate in a second rotational direction opposite to the first rotational direction.

It can thereby thus be checked stepwise whether in the opposing rotational directions the rotor 12 shows an expected response behavior. By repeated performance of the substeps a1) and a2) the full rotational angle of 360° can thereby also be sensed, and it can be checked whether the electric motor 10 shows an expected response behavior in all angular ranges.

In order to be able to achieve systematic and thus effective sensing of the full rotational angle of 360°, it can be provided here that the step a) includes at least N substeps a1), which are performed consecutively. N can be chosen here such that with N-fold performances of the substep a1) the rotor 12 performs at least one full rotation in the first rotational direction. The drive voltages VA, VB, VC to be applied to the magnetic-field-generating means 18A, 18B, 18C have been discussed above in connection with FIG. 4.

Moreover it can be provided that the step a) comprises at least M substeps a2), which can be performed consecutively after the N-fold performance of the step a1). Here M can be chosen such that with the M-fold embodiment of the substeps a2) the rotor 12 performs at least one full rotation in the second rotational direction.

High reliability in determining the response behavior of the electric motor 10 can be ensured if a set of N performances of the substep a1) and M performances of the substep a2) are performed U times. In practice a value for U of under 20 has proven sufficient to reliably determine the response behavior and from that to precisely determine the state of the electric motor 10.

Depending on the results determined in step b), step c) can comprise the following states:
- "normal," if it is detected in step b) that the rotor 12 rotates through the prescribed angle of rotation α in opposite rotational directions, and the electric current I detected in step b) lies within a prescribed range,
- "faulty," if it is detected in step b) that the rotor 12 does not rotate through the prescribed angle of rotation α in opposing rotational directions, and/or the electric current I detected in step b) does not lie within the prescribed range.

If the state of the electric motor 10 is determined to be "normal" then the electric motor 10 is ready for operation. If the state of the electric motor 10 is determined to be "faulty" then the electric motor 10 may not necessarily be unready for operation; but under certain circumstances actions can be taken for producing an operational readiness state of the electric motor 10. However, these actions depend on the specific fault of the electric motor 10, which can optionally be characterized in more detail for taking the appropriate action.

The "faulty" state can include a "critical" state if it is detected in step b) that the rotor 12 rotates through the prescribed angle α in opposite directions and the electric current I detected in step b) lies outside the prescribed range. The "critical" state can be present, for example, if the electric motor 10 is in a cold environment, and due to thermally caused mechanical stresses, more power is required than with higher temperatures to rotate the rotor 12 through the prescribed angle of rotation α.

Furthermore the "faulty" state can comprise the following states:
- "blocked in one direction," if it is detected in step b) that the rotor 12 rotates through the prescribed angle of rotation α only in one rotational direction,
- "blocked," if it is detected in step b) that the rotor 12 does not rotate through the prescribed angle of rotation α in any rotational direction and the electric current I detected in step b) lies above the prescribed range,
- "inoperative," if in step b) it is detected that the rotor 12 does not rotate through the prescribed angle of rotation α in any direction of rotation and the electric current detected in step b) lies outside the prescribed range.

If the state of the electric motor has been determined to be "critical," then after the step c) the method can comprise a step d) wherein in step d) an electric operating voltage is applied to the electric motor 10 for a prescribed period of time T_W for continuous rotation of the rotor 10 in a direction of rotation, and the electric current flowing through the electric motor 10 is detected, wherein the state of the electric motor
- is determined as "normal" if the electric current I detected in step d) assumes values during the prescribed time period T_W that lie in the prescribed range, or
- is determined as "inoperative" if the electric current I detected in step d) assumes no values during the prescribed time period T_W that lie within the prescribed range.

With this approach the attempt is made using heat generated during operation of the electric motor 10 to eliminate possible thermally caused mechanical stresses inside the electric motor. If this succeeds, then after or even during the prescribed time period T_W the detected electric current I assumes values that lie within the prescribed range. The state of the electric motor 10 can thus be determined as "normal" so that the electric motor 10 is thus ready for operation. If no current values that lie in the prescribed range are detected during the prescribed time period T_W, then a different problem can be present than, for example, thermally caused mechanical stresses, for the repair of which a basic examination of the electric motor 10 is necessary. The state of the electric motor is thus "inoperative" and the electric motor 10 is thus not ready for operation. A prescribed time period of more than 60 s has proven advantageous for this purpose.

It can further be provided that the method comprises a step d') after the step c), if in step c) the state has been determined as "blocked" or "blocked in one direction," wherein in step d') an electric heating drive voltage VHA, VHB, VHC is applied to the electric motor 10 for a prescribed maximum time period T_MAX in order to drive the rotor 12 to rotate, preferably in different rotational directions, wherein simultaneously the electric current I flowing through the electric motor 10 due to the heating drive voltage VHA, VHB, VHC is detected, and it is determined whether the rotor 12 is rotated by the heating drive voltage VHA, VHB, VHC until one of the following conditions occurs:

i) the prescribed maximum time duration T_MAX is elapsed without the rotor 12 having rotated or without the rotor 12 having rotated in the previously blocked direction of rotation, ii) the rotor 12 rotates or rotates in the previously blocked direction of rotation, iii) the electric current flowing through the electric motor 10 has fallen below a prescribed threshold value I_MIN_TH.

Figure 5:
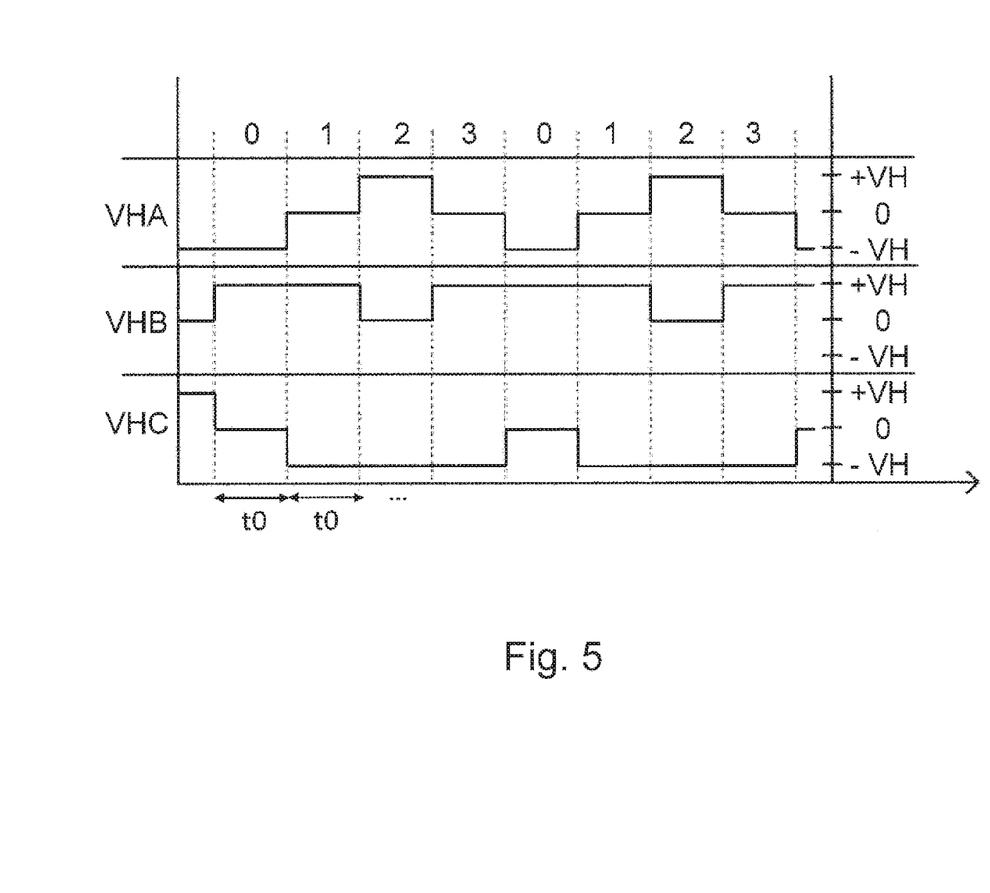
FIG. 5 shows a sequence of heating drive voltage values for the three phases of the electric motor.

In principle, as in step a), an essentially constant DC voltage VH can be applied in step d') for a prescribed time period t0 only to the magnetic-field-generating means 18A, 18B, 18C of two phases A, B, C, while no voltage is applied to the magnetic-field-generating means 18A, 18B, 18C of the third phase A, B, C. Similarly to the multiple performance of step a), in step d') this DC voltage can also be changed at the end of the prescribed time span t0 in order to drive the rotor 12 to rotate through a multiple of the prescribed angle of rotation α. However, in contrast to the drive voltage VA, VB, VC, it is preferred if the rotor 12 is subjected to a change in rotational direction more often by to the heating drive voltage VHA, VHB, VHC in order to release a blockage, for example, by a frozen medium in the region of the electric motor 10. An exemplary sequence of heating drive voltage values to be applied to magnetic-field-generating means 18A, 18B, 18C of the three phases A, B, C during the respective time spans t0 is shown in FIG. 5. The respective heating drive voltages VHA, VHB, VHC each comprise a base sequence of heating drive voltage values, which can be repeated cyclically for the respective phases A, B, C.

According to FIG. 5, for the first phase A the base sequence comprises the following heating drive voltage values to be applied to the magnetic-field-generating means 18A of the first phase A in the following sequence:
0. −VH
1. 0
2. +VH
3. 0.

According to FIG. 5, for the second phase B the base sequence comprises the following heating drive voltage values to be applied to the magnetic-field-generating means 18B of the first phase B in the following sequence:
0. +VH
1. +VH
2. 0
3. +VH.

According to FIG. 5, for the third phase C the base sequence comprises the following heating drive voltage values to be applied to the magnetic-field-generating means 18C of the third phase C in the following sequence:
0. 0
1. −VH
2. −VH
3. −VH If these heating drive voltage values repeat cyclically for each phase A, B, C, in contrast to FIG. 4 the rotor 12 of the electric motor 10 can be driven more often to a change in direction of rotation. According to the diagram shown in FIG. 5 a change in direction of rotation of the rotor 12 takes place in the electric motor 10 shown in FIGS. 1 to 3 respectively between the steps 0 and 1 and the steps 2 and 3.

However, this sequence of heating drive voltage values is only exemplary and can be changed in diverse ways depending on the specific design of the electric motor 10.

If the electric motor 10 is configured as a pump motor for pumping a fluid, preferably of aqueous urea solution from a tank, it can be provided that the step d') is only performed if at least one further condition is fulfilled, which is indicative of low temperatures in the region of the electric motor 10, for example, if the temperature at the tank lies below a temperature threshold value and/or of a tank heater is operated.

If the electric motor 10 does not rotate at the end of the prescribed maximum time period T_MAX after the application of the heating drive voltage VHA, VHB, VHC, then the method can be ended and the state of the electric motor 10 can be determined as "inoperative." Therefore it is not ready for operation. If the rotor 12 of the electric motor rotates due to the heating drive voltage VHA, VHB, VHC or if the current lies below a prescribed threshold value I_MIN_TH during or at the end of the prescribed maximum time period T_MAX, then the steps a) to c) can be performed again in order to characterize the response behavior of the electric motor 10 again and to determine again the state of the electric motor 10 based on the response behavior. The prescribed maximum time period T_MAX is preferably between 120 and 4000 s.

Figure 6:
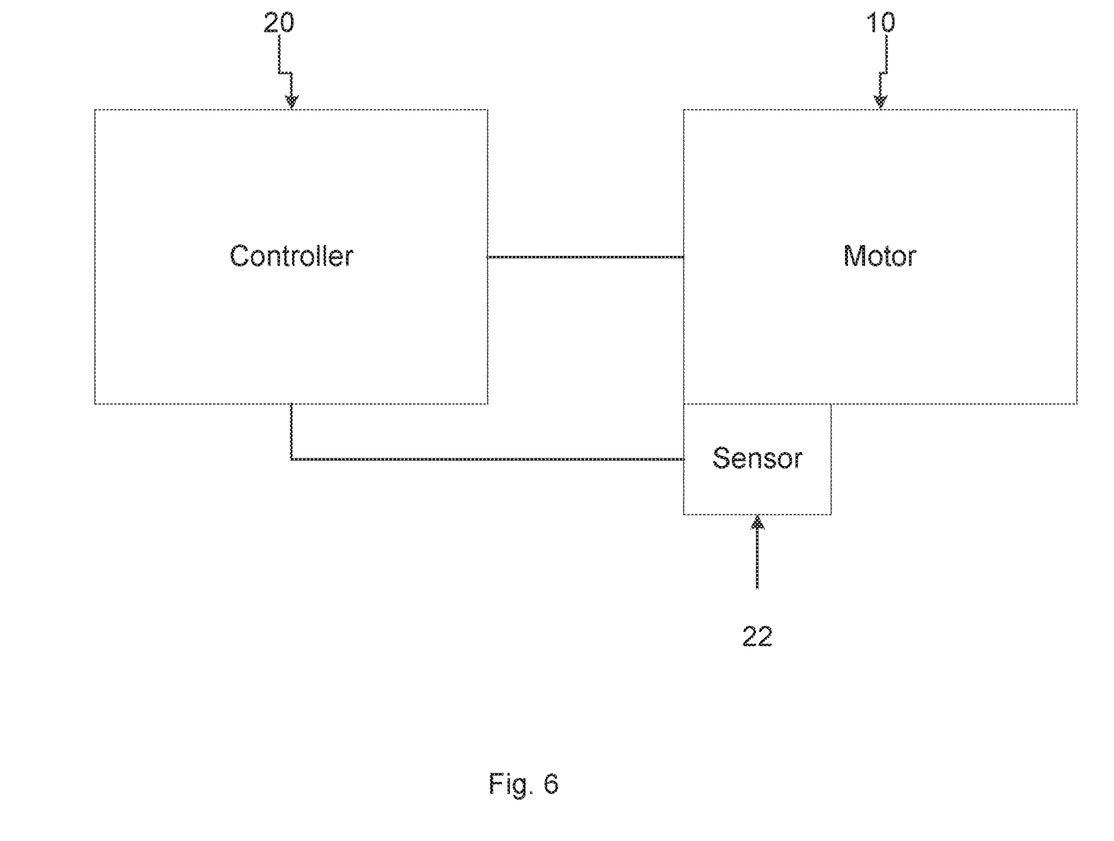
FIG. 6 shows an apparatus for determining an operational readiness state of an electric motor.

FIG. 6 illustrates an apparatus according to an embodiment of the present invention. The apparatus may include a controller 20, which may comprise a circuit, or combination of hardware and software, and which is electrically coupled with the motor 10. Controller 20 may be coupled with a sensor 22, which may be positioned on the rotor, for example, and may include an optical sensor or a Hall sensor. Controller 20 may include a power source (not shown) or be coupled to the power source supplying the motor 10, and may be configured to perform one or more of methods described above. For example, in accordance with the embodiments disclosed above, a controller can be configured to apply an electric drive voltage to the electric motor according to a stored or prescribed drive voltage curve in order to drive a rotor of the electric motor to rotate through a prescribed angle of rotation, detect via sensor 22 a response behavior of the electric motor, and determine the state of the electric motor based on the detected response behavior.

The invention claimed is:
1. A method for determining an operational readiness state of an electric motor, the method comprises the steps:
   a) applying an electric drive voltage to the electric motor according to a prescribed drive voltage curve in order to drive a rotor of the electric motor to rotate through a prescribed angle of rotation, wherein the prescribed angle of rotation is smaller than 360°,
   b) detecting a response behavior of the electric motor, comprising the partial steps:
      b1) determining whether the rotor rotates through the prescribed angle of rotation due to the application of the electrical drive voltage in step a), and
      b2) detecting an electric current flowing through the electric motor during the application of the electrical drive voltage in step a),
   c) determining the state of the electric motor based on the results determined in step b),
   wherein step c) comprises the following states:
   "normal," if it is detected in step b) that the rotor rotates through the prescribed angle of rotation in opposite rotational directions, and the electric current detected in step b) lies within a prescribed range,
   "faulty," if it is detected in step b) that the rotor does not rotate through the prescribed angle of rotation in opposite rotational directions, and/or the electric current detected in step b) does not lie within the prescribed range.
2. The method according to claim 1,
wherein a plurality of steps a) are performed consecutively, wherein for each step a) a step b) is performed.
3. The method according to claim 2,
wherein the step a) comprises at least N substeps a1), which are performed consecutively.
4. The method according to claim 3,
wherein the step a) comprises at least M substeps a2), which are performed consecutively after the N-fold performance of the substeps a1).
5. The method according to claim 3,
wherein a set of N performances of the substep a1) and M performances of the substep a2) is performed U times.
6. The method according to claim 2, wherein the plurality of steps a) comprises:
   at least one substep a1) wherein a first drive voltage is applied to the electric motor in order to drive the rotor to rotate in a first direction of rotation through the prescribed angle of rotation, and
   at least one substep a2), wherein a second drive voltage is applied to the electric motor in order to drive the rotor to rotate in a second direction, opposite to the first direction, through the prescribed angle of rotation.
7. The method according to claim 1,
wherein the drive voltage applied to the electric motor during the step a) is switched off if the electric current detected in the associated step b) is greater than a prescribed threshold value.
8. Method according to claim 1,
wherein the electric motor is a three-phase brushless motor, wherein each phase is respectively associated with its own magnetic-field-generating means, wherein preferably during the performance of the step a) a drive voltage is simultaneously applied only to the magnetic-field-generating means of two phases, while no electric drive voltage is applied to the magnetic-field-generating means of a third phase.
9. The method according to claim 8,
wherein in each two immediately consecutive performances of the step a) no drive voltage is applied to the magnetic-field-generating means of different phases.
10. The method according to claim 8,
wherein in step b) an electromotive force is detected, which is generated in the magnetic-field-generating means of that phase to which no drive voltage is applied during the performance of step a).
11. The method according to claim 10,
wherein in step b) the angle of rotation covered by the rotor due to the drive voltage applied in step a) can be concluded from the detected electromotive force.
12. The method according to claim 1,
wherein the "faulty" state includes a "critical" state if it is detected in step b) that the rotor rotates in opposite directions through the prescribed angle of rotation and the electric current detected in step b) lies outside the prescribed range.
13. The method according to claim 12,
wherein the "critical" state comprises the following states:
"blocked in one direction," if it is detected in step b) that the rotor rotates through the prescribed angle of rotation only in one rotational direction,
"blocked," if it is detected in step b) that the rotor does not rotate through the prescribed angle of rotation in any rotational direction and the electric current detected in step b) lies above the prescribed range,
"inoperative," if in step b) it is detected that the rotor does not rotate through the prescribed angle of rotation in any direction of rotation and the electric current detected in step b) lies outside the prescribed range.
14. The method according to claim 13,
wherein the method comprises a step d') after the step c), if in step c) the state has been determined as "blocked" or "blocked in one direction," wherein in step d') an electric heating drive voltage is applied to the electric motor for a prescribed maximum time period according to a prescribed heating drive voltage curve in order to drive the rotor to rotate wherein simultaneously the electric current flowing through the electric motor due to the heating drive voltage is detected, and it is determined whether the rotor is rotated due to the heating drive voltage until one of the following conditions occurs:
   i) the prescribed maximum time is elapsed without the rotor having rotated or without the rotor having rotated in the previously blocked direction of rotation,
   ii) the rotor rotates or rotates in the previously blocked direction of rotation,
   iii) the electric current flowing through the electric motor has fallen below a prescribed threshold value.
15. The method according to claim 14,
wherein the electric motor is configured as a pump motor for pumping a fluid from a tank, wherein step d') is only performed if at least one further condition is fulfilled, which is indicative of low temperatures in the region of the electric motor, for example, if the temperature at the tank lies below a temperature threshold value and/or of a tank heater is operated.
16. The method according to claim 14,
wherein
the state of the electric motor is determined as "inoperative" if condition i) occurs, or the steps a) to c) are performed again if one of the conditions ii) or iii) occurs.

17. The method according to claim 14, wherein the electric motor is configured as a pump motor for pumping an aqueous urea solution, from a tank, wherein step d') is only performed if at least one further condition is fulfilled, which is indicative of low temperatures in the region of the electric motor, for example, if the temperature at the tank lies below a temperature threshold value and/or of a tank heater is operated.

18. The method according to claim 14, wherein in step d') the electric heating drive voltage curve that is different from the drive voltage curve.

19. The method according to claim 14, wherein in step d') the electric heating drive voltage is applied to the electric motor for a prescribed maximum time period according to a prescribed heating drive voltage curve in order to drive the rotor to rotate in different rotational directions.

20. The method according to claim 13, wherein the electric motor is not ready for operation if its state has been determined as "inoperative."

21. The method according to claim 12, wherein after the step c) the method comprises a step d) if in step c) the state was determined as "critical," wherein in step d) an electric operating voltage for an intended operation is applied to the electric motor for a prescribed period of time for continuous rotation of the rotor in a direction of rotation, and the electric current flowing through the electric motor is detected, wherein the state of the electric motor
is determined as "normal" if the electric current detected in step d) assumes values during the prescribed time period that lie in the prescribed range, or
is determined as "inoperative" if the electric current detected in step d) assumes no values during the prescribed time period that lie within the prescribed range.

22. The method according to claim 1, wherein the electric motor is ready for operation if its state has been determined as "normal."

23. An apparatus for determining an operational readiness state of an electric motor, comprising:
a controller coupled with the electric motor; and
a sensor;
wherein said controller is configured to:
apply an electric drive voltage to the electric motor according to a prescribed drive voltage curve in order to drive a rotor of the electric motor to rotate through a prescribed angle of rotation ($\alpha$),
wherein the prescribed angle of rotation ($\alpha$) is smaller than 360°,
determine whether the rotor rotates through the prescribed angle of rotation due to the application of the electrical drive voltage to the electric motor,
detect an electric current flowing through the electric motor during the application of the electrical drive voltage to the electric motor,
detect a response behavior of the electric motor with said sensor, and
determine the state of the electric motor based on the results detected wherein determining the state of the electric motor comprises the following states:
"normal," if it is detected that the rotor rotates through the prescribed angle of rotation in opposite rotational directions, and the electric current lies within a prescribed range,
"faulty," if it is detected in step b) that the rotor does not rotate through the prescribed angle of rotation in opposite rotational directions, and/or the electric current detected in step b) does not lie within the prescribed range.

* * * * *